United States Patent
Davis

(10) Patent No.: US 8,001,213 B2
(45) Date of Patent: Aug. 16, 2011

(54) METHOD, APPARATUS AND COMPUTER PROGRAM PRODUCT FOR PROVIDING UNRESTRICTED CONTENT ON A USER TERMINAL

(75) Inventor: Franklin Arthur Davis, Newton, MA (US)

(73) Assignee: Nokia Corporation, Espoo (FI)

(*) Notice: Subject to any disclaimer, the term of this patent is extended or adjusted under 35 U.S.C. 154(b) by 308 days.

(21) Appl. No.: 12/341,570

(22) Filed: Dec. 22, 2008

(65) Prior Publication Data

US 2010/0161754 A1    Jun. 24, 2010

(51) Int. Cl.
G06F 15/16    (2006.01)
(52) U.S. Cl. ...................................................... 709/217
(58) Field of Classification Search .................... 709/217
See application file for complete search history.

(56) References Cited

U.S. PATENT DOCUMENTS

| | | | |
|---|---|---|---|
| 6,370,552 B1 | 4/2002 | Bloomfield | |
| 6,738,803 B1 | 5/2004 | Dodrill et al. | |
| 7,274,927 B2 | 9/2007 | Olrik | |
| 7,325,045 B1 | 1/2008 | Manber et al. | |
| 2003/0033410 A1* | 2/2003 | Kobayashi | 709/225 |
| 2005/0144616 A1* | 6/2005 | Hammond et al. | 717/173 |
| 2005/0251551 A1 | 11/2005 | Mitchell et al. | |
| 2007/0016696 A1* | 1/2007 | Jerrard-Dunne et al. | 709/250 |
| 2007/0041043 A1* | 2/2007 | Murakami et al. | 358/1.15 |
| 2010/0168995 A1* | 7/2010 | Van Der Meer | 701/200 |
| 2010/0169003 A1* | 7/2010 | Van Der Meer | 701/207 |

FOREIGN PATENT DOCUMENTS

WO    WO 2005/114395 A1    12/2005

OTHER PUBLICATIONS

International Search Report and Written Opinion, PCT/FI2009/050730, Dec. 23, 2009, pp. 1-15.

* cited by examiner

*Primary Examiner* — Frantz B Jean
(74) *Attorney, Agent, or Firm* — Ditthavong Mori & Steiner, P.C.

(57) ABSTRACT

An apparatus for providing unrestricted content on a user terminal may include a processor. The processor may be configured to invoke a substitute function expansion application to request access to content associated with an object, in response to receiving an indication of an unknown function expansion application required to access the content associated with the object. The processor may further be configured to communicate information associated with the object to a network entity via the substitute function expansion application. The processor may also be configured to process the content associated with the object received from the remote network entity via the function expansion application, in response to the network entity accessing the content at a location associated with the network entity, and provide the received content associated with the object.

18 Claims, 4 Drawing Sheets

US 8,001,213 B2

METHOD, APPARATUS AND COMPUTER PROGRAM PRODUCT FOR PROVIDING UNRESTRICTED CONTENT ON A USER TERMINAL

TECHNOLOGICAL FIELD

Embodiments of the present invention relate generally to communication interface technology and, more particularly, relate to a method, apparatus, and computer program product for providing unrestricted content on a user terminal.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the provision of content to users of a mobile terminal accessible via the Internet, other network resources or the like. Current networking technologies enable a mobile terminal to access content over the Internet using a browser, such as a web browser. While some types of content available over the Internet may be accessed with ease, other types of content may require the use of plug-ins. The mobile terminal may be pre-installed with some plug-ins (and may or may not be capable of downloading and installing additional plug-ins, and the browser may include or otherwise be in communication with the plug-ins. Accordingly, plug-ins may be used to access some content that may be compatible with plug-ins. If content cannot be accessed for lack of compatible plug-ins, the browser may output an error message, provide an indicator (e.g., blank page, blank rectangle, error icon and/or the like) signifying that the content cannot be retrieved, and/or the like.

Although existing technologies may allow the access of some content over the Internet via a browser of a mobile terminal, it is generally desirable to continue improvement of existing technologies.

BRIEF SUMMARY

A method, apparatus and computer program product are therefore provided for providing unrestricted content on a user terminal, such as, for example, web content. In particular, a method, apparatus and computer program product are provided that create a mechanism for enabling the provision of all web or other Internet or network related content with any known plug-in on a user terminal without the need to constantly download and/or update plug-ins on the user terminal, or even to create versions of plug-ins compatible with the user terminal's operating system software and hardware. Thus, for example, content provided by an object requiring a missing, unknown, unsupported and/or outdated plug-in (generally referred to as unknown plug-in) may be accessible and provided to the user of the user terminal without downloading the unknown plug-in to the user terminal and/or updating an existing plug-in or if the unknown plug-in is not available in a version compatible with the user terminal.

In this regard, for example, a browser or web application (generally referred to as a browser) may access or otherwise fetch a page (e.g., a web page), for example from an origin server, associated with a Uniform Resource Identifier (URI) (e.g., a Uniform Resource Locator (URL)) and detect or identify at least one object associated with the page which may require an unknown plug-in. The object may be located within a defined area or portion of the page. Upon identifying the object and recognizing the need for an unknown plug-in, the browser may automatically invoke a communal plug-in instead of the unknown plug-in. In other words, the communal plug-in may be substituted for the unknown plug-in, and may be provided with the area on the page defined for the object (within a vicinity thereof). The communal plug-in may receive information from the browser such as information associated with the page and/or the object, the value of the URL, cookies or other information associated with or specific to the user, terminal or browsing session (generally referred to as context), and communicate the information to a network entity (e.g., a service platform).

The network entity may execute a browser or web application (e.g., a full browser application) to access or otherwise fetch the page and content associated with the URL. The browser or web application may send the context information (e.g., information received from the communal plug-in) to an origin server from which the page may be fetched in order to duplicate the context of the page as it was fetched on the user terminal. The browser or web application may include the required unknown plug-in and may thus be able to access the content associated with the object, and capture the content associated with the portion of the page corresponding to the object. The network entity may communicate the captured portion of the page to the communal plug-in in various different manners (e.g., image stream(s), video stream(s), audio stream(s), stream of other types of media, multimedia, or other content types including but not limited to motion, vibration, temperature, smell, and/or any other content that may be perceived, and/or other content that may control or affect some other user terminal(s), electronic device(s) (e.g., communication device), function, database, or other mechanism). The communal plug-in may in turn seamlessly provide the captured portion received from the network entity to the user. Accordingly, the communal plug-in may be compatible with all web or other Internet or other network related content, and as such all web or other Internet or other network related content for any available plug-ins may be provided on a user terminal without requiring downloads and/or updates of the plug-ins. The communal plug-in and the network entity may maintain a communication with each other for a period of time, during which the communal plug-in and the network entity may exchange (e.g., send, receive) information such as events for interacting with the page (e.g., received from the user terminal), updates to the content associated with the object (e.g., in response to the events), and/or the like. Accordingly, full browser capabilities may be achieved, and the user may enjoy full browser experience on a user terminal.

In one exemplary embodiment, a method of providing unrestricted content on a user terminal is provided. The method may include invoking, at an application manager, a substitute function expansion application to request access to content associated with an object, in response to receiving an indication of an unknown function expansion application required to access the content associated with the object, communicating information associated with the object to a network entity via the substitute function expansion application, processing the content associated with the object received from the remote network entity via the function expansion application, in response to the network entity accessing the content at a location associated with the network entity, and providing the received content associated with the object.

In another exemplary embodiment, a computer program product for providing unrestricted content on a user terminal is provided. The computer program product includes at least one computer-readable storage medium having computer-executable program code instructions stored therein. The computer-executable program code instructions may include program code instructions for invoking a substitute function expansion application to request access to content associated with an object, in response to receiving an indication of an unknown function expansion application required to access the content associated with the object, communicating information associated with the object to a network entity via the substitute function expansion application, processing the content associated with the object received from the remote network entity via the function expansion application, in response to the network entity accessing the content at a location associated with the network entity, and providing the received content associated with the object.

In another exemplary embodiment, an apparatus for providing unrestricted content on a user terminal is provided. The apparatus may include a processor that may be configured to invoke a substitute function expansion application to request access to content associated with an object, in response to receiving an indication of an unknown function expansion application required to access the content associated with the object. The processor may further be configured to communicate information associated with the object to a network entity via the substitute function expansion application. The processor may also be configured to process the content associated with the object received from the remote network entity via the function expansion application, in response to the network entity accessing the content at a location associated with the network entity, and provide the received content associated with the object.

In another exemplary embodiment, an apparatus for providing unrestricted content on a user terminal is provided. The apparatus includes means for invoking a substitute function expansion application to request access to content associated with an object, in response to receiving an indication of an unknown function expansion application required to access the content associated with the object, means for communicating information associated with the object to a network entity via the substitute function expansion application, means for processing the content associated with the object received from the remote network entity via the function expansion application, in response to the network entity accessing the content at a location associated with the network entity, and means for providing the received content associated with the object.

Embodiments of the invention may provide a method, apparatus and computer program product for employment in a web based, or other network based operating environment in mobile or fixed devices environments. As a result, for example, device users may enjoy improved capabilities with respect to applications and services accessible via the device, such as for example, full browser (e.g., personal computer (PC) browser) experience. Accordingly, all web or other Internet or other network related content associated with any available plug-in may be provided to device users.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
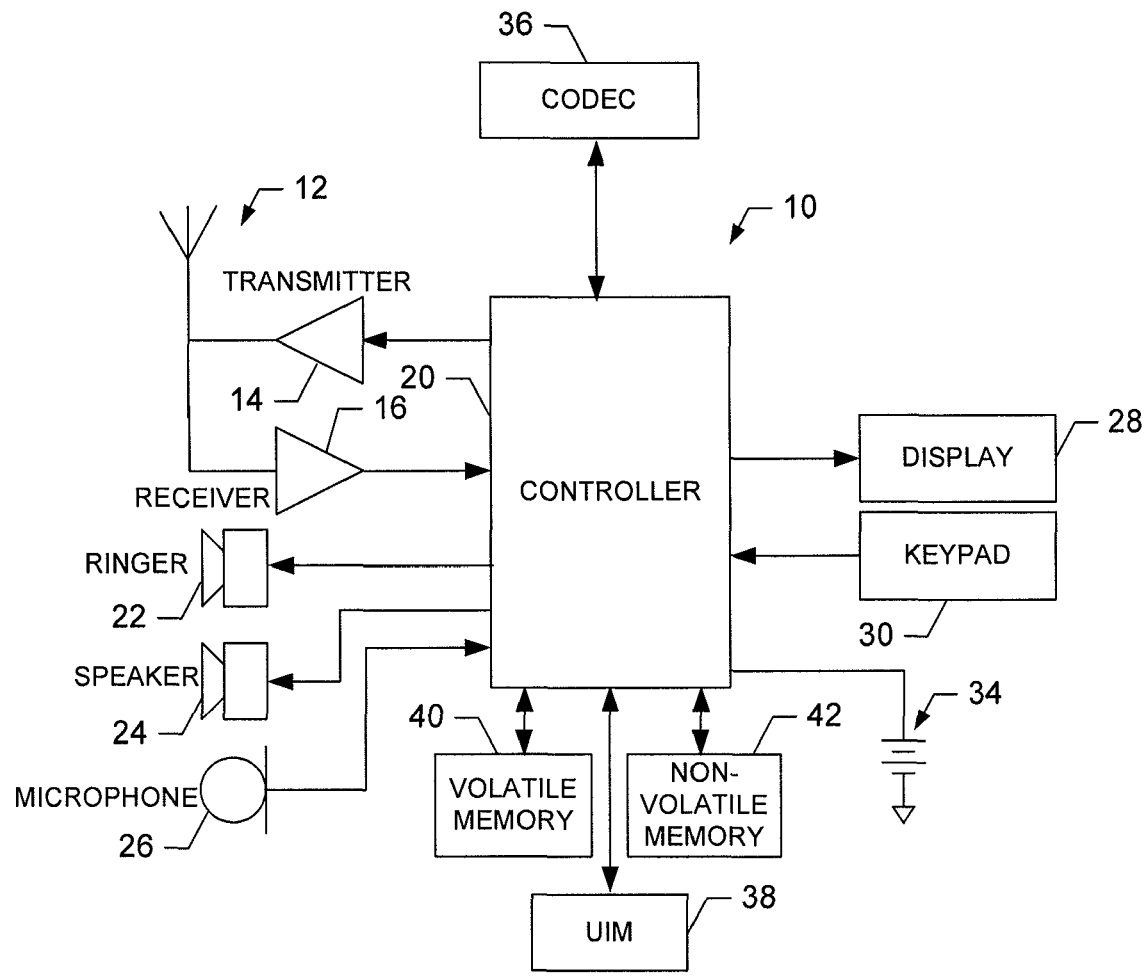
FIG. 1 illustrates a block diagram of a user terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. As used herein, the term "content" may be used to refer to web content. Moreover, the term "exemplary", as used herein, is not provided to convey any qualitative assessment, but instead merely to convey an illustration of an example. The terms "automatic," "automatically," "automated" or the like may be used interchangeably to refer to an action or operation requiring no user intervention.

FIG. 1 illustrates a block diagram of a user terminal, such as a mobile terminal 10, that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, global positioning system (GPS) devices, mobile telephones any combination of the aforementioned, and/or other types of voice and text communications systems (e.g., displays in airplanes and/or the like, displays in other locations such as gas pumps, elevators, appliances), can readily employ embodiments of the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element, that may provide signals to and receive signals from the transmitter 14 and receiver 16, respectively. The signals may include signaling information in accordance with the air interface standard of the applicable cellular system, and/or may also include data corresponding to speech, received data and/or user generated/transmitted data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols and/or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

The controller 20 may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 may be allocated between these devices according to their respective capabilities. The controller 20 may also support other functionality for use in encoding, receiving and/or transmitting messages. Further, the controller 20 may include functionality to operate one or more software programs, which may be stored in memory. For example, the controller 20 may be capable of operating a connectivity program, such as a conventional web browser. The connectivity program may then allow the mobile terminal 10 to transmit and receive web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a microphone 26, a display 28, and a user input interface, which may be operationally coupled to the controller 20. The user input interface, which allows the mobile terminal 10 to receive data, may include any of a number of devices allowing the mobile terminal 10 to receive data, such as a keypad 30, a touch display (not shown), a scrolling device, or other input device. In embodiments including the keypad 30, the keypad 30 may include numeric (0-9) and related keys (#, *), and other hard and soft keys used for operating the mobile terminal 10. Alternatively, the keypad 30 may include a QWERTY keypad arrangement. The keypad 30 may also include various soft keys with associated functions. In addition, or alternatively, the mobile terminal 10 may include an interface device such as a joystick, acceleromter, other position or motion sensing input device, haptic or other output device, or other user input interface. The mobile terminal 10 may further include a battery 34, such as a vibrating battery pack, for powering various circuits that are used to operate the mobile terminal 10, as well as optionally providing mechanical vibration as a detectable output.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 can additionally or alternatively comprise an electrically erasable programmable read only memory (EEPROM), flash memory, other non-volatile RAM (NVRAM) or the like. Non-volatile memory 40 may also include a cache area for the temporary storage of data. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication. The mobile terminal 10 may also include a codec module 36 to decode, encode, compress, and/or decompress data (e.g., data stream) or a signal, such as, for example, data received from a network entity.

As used herein, the term "object" may be used to refer to an application (e.g., media, multimedia, communication, interactive applications, and/or the like), such as a music player, a game player, an electronic book, short or multimedia messages, email, content sharing, and/or the like, a media item, a multimedia item, and/or the like. Further, the term "full browser" may be used to refer to a browser or web browser application that may include all available plug-ins or may be configured to download and/or update new and/or existing plug-ins, and as such, may not be limited to the types of content it may provide, or otherwise provide the capabilities of, for example, a browser or web browser application of a personal computer (PC). The term "unknown plug-in" may be used to refer to new plug-ins or plug-ins not in existence on the user terminal, new or updated versions (or other variations) of existing plug-ins, unusual plug-ins, and/or the like, without which content may be not be accessed or retrieved. The term "unknown plug-in" may also be used to refer to a plug-in that may be unavailable (e.g., on the user terminal), incompatible with the user terminal (e.g., on the user terminal), out-of-date, and/or inefficient. The term "communal plug-in" may be used to refer to a plug-in which may replace an unknown plug-in, or in other words, used as a substitute for an unknown plug-in to access content compatible with the unknown plug-in. As such, the communal plug-in may be used to communicate with a network entity, and the content associated with one or more objects requiring the unknown plug-in may be accessed and provided from the network entity via the communal plug-in. Thus, use of any such terms should not be taken to limit the spirit and scope of embodiments of the present invention.

Exemplary embodiments of the present invention generally provide a method, computer program product and apparatus for providing unrestricted content on a user terminal. In particular, a method, apparatus and computer program product are provided that create a mechanism for enabling the provisioning on a user terminal of all web or other Internet or network related content with any known plug-in without the need to download and/or update plug-ins on the user terminal. In this regard, for example, a browser or web application may access or otherwise fetch a page (e.g., a web page) associated with a Uniform Resource Identifier (URI) (e.g., a Uniform Resource Locator (URL)), and detect or identify at least one object associated with the page. The object may be located within a defined area or portion of the page. The object may determine that the object requires an unknown plug-in to access the content associated with the object. Upon identifying the object and determining the need for an unknown plug-in, the browser may automatically invoke a communal plug-in instead of the unknown plug-in. In other words, the communal plug-in may be substituted for the unknown plug-in, and may be provided within the area defined for the object (or within a vicinity thereof). In some examples, the communal plug-in may be loaded by one or more some application program interface(s) (API(s)) (e.g., Netscape plug-in APIs). The communal plug-in may receive context information from the browser such as the value of the URL, information associated with the page (e.g., cookies, login information, and/or the like) and/or the object (e.g., identification, properties, parameters, position, size and/or scale within the page, and/or the like), other information (e.g., the size of the display of the user terminal, the portion of the page within a viewable area of the display, screen resolution, other configuration and properties of the user terminal and/or the browser, and/or the like), and may communicate the information to a network entity. In some examples, the communal plug-in may be associated with the network entity. In this regard, the communal plug-in may be used to communicate with the network entity by being configured to establish a session with the network entity, during which information may be exchanged between the communal plug-in and the network entity.

The network entity may execute a browser (e.g., a full browser) to access or otherwise fetch the page and content associated with the received value of the URL. The browser may include the required unknown plug-in and may thus be able to access the content associated with the object. The network entity may be configured to identify the position of the object within the page, and capture the content associated with the portion of the page corresponding to the object (e.g., capture of image(s), audio, other media, multimedia, and/or other types of content associated with the content associated with the object). The network entity may be configured to scale, resize, or otherwise modify the captured the content based at least in part on the context information associated with the object (e.g., communicated to the network entity). The network entity may communicate the captured portion of the page to the communal plug-in in various different manners (e.g., video stream(s), audio stream(s), stream(s) of other types of media, multimedia, and/or other types of content). In some examples, the content may be static, and as such, a single image (and/or related audio, media, multimedia, and/or other types of content were available) may be captured and communicated to the communal plug-in. In other examples, the content may be dynamic (e.g., interactive multimedia), and as such, multiple images (and/or related audio, media, multimedia, and/or other types of content were available) may be captured and communicated to the communal plug-in in the form of a video stream. The communal plug-in may in turn seamlessly provide (e.g., display, play, and/or the like) the captured portion received from the network entity to the user of the user terminal. As such, all web or other Internet or other network related content for any available plug-ins may be provided on a user terminal without requiring downloads and/or updates of the plug-ins.

The communal plug-in and the network entity may maintain a communication with each other for a period time, during which the communal plug-in and the network entity may exchange (e.g., send, receive) information so as to maintain the context of the page (e.g., the content of the page for example within a viewable portion of the user terminal, which may include audio, video, media, multimedia, and/or other types of content) in sync between the browser of the user terminal and the browser of the network entity. For example, the user may interact with the web page via input events such as, for example, key press events (e.g., on a keypad), touch events (e.g., on a touch display), scrolling events (e.g., on a scrolling device), other events or interactions associated with the page (e.g., via JavaScript, Document Object Model (DOM), other scripting language, computer or web programming language, and/or the like) received from the user terminal. These events and/or interactions, which may cause a modification of the content of the page, including the content associated with the object, may be received by the communal plug-in from the browser and communicated to the network entity via the communal plug-in. The network entity may cause similar interactions to occur at the browser of the network entity, and communicate any updates to the content associated with the object (e.g., in response to the events and/or interactions) to the communal plug-in. Similarly, events and/or interactions may also be received at the page displayed by the browser of the network entity. The network entity may also cause information associated with these events and interactions to be communicated to the communal plug-in. The communal plug-in may cause the same or similar events and/or interactions received from the network entity to be executed at the browser of the user terminal for the fetched page, and the result(s) thereof to be displayed to the user. Accordingly, full browser capabilities may be achieved, and the user may enjoy full browser experience on a user terminal.

Embodiments of the present invention may also provide the detection and substitution of inefficient plug-ins, such outdated plug-ins or plug-ins that may consume considerable amounts of resources (e.g., data bandwidth, for example, when accessing large data associated with the object, processing resources, memory, and/or the like) from the user terminal, particularly in conjunction with the limitations of a network (e.g., limitations on data connection, data transfer, and/or the like), which inefficient plug-ins may otherwise negatively affect the performance of user terminals, and degrade user experience. In this regard, the communal plug-in may be automatically substituted when a plug-in that is implemented on the device is consuming too much data bandwidth, processing resource, memory, and/or the like.

Although exemplary embodiments of the present invention may be described generally with respect to browser or web applications, embodiments of the present invention may be equally applicable to other types of applications (e.g., communication application (email clients), media applications, multimedia applications, gaming applications, and/or the like) that may require a function expansion module such as a plug-in. Additionally, although exemplary embodiments of the present invention may be described generally with respect to unknown plug-ins, embodiments of the present invention may be equally applicable to existing plug-ins on the device which may be outdated and/or inefficient (e.g., high consumption of resources such as, for example, data bandwidth, processing or memory resources). Moreover, although exemplary embodiments of the present invention may be described generally with respect to a single unknown plug-in, embodiments of the present invention may be equally applicable to multiple unknown plug-ins. Embodiments of the present invention may include a browser which may fetch the content of a page by a network entity using HyperText Markup Language (HTML), and the content may be communicated to the communal plug-in (and provided to the browser of the user terminal). As such, embodiments of the present invention may be equally applicable to providing an entire content of a page to a user terminal via communication between a communal plug-in with a network entity.

Figure 2:
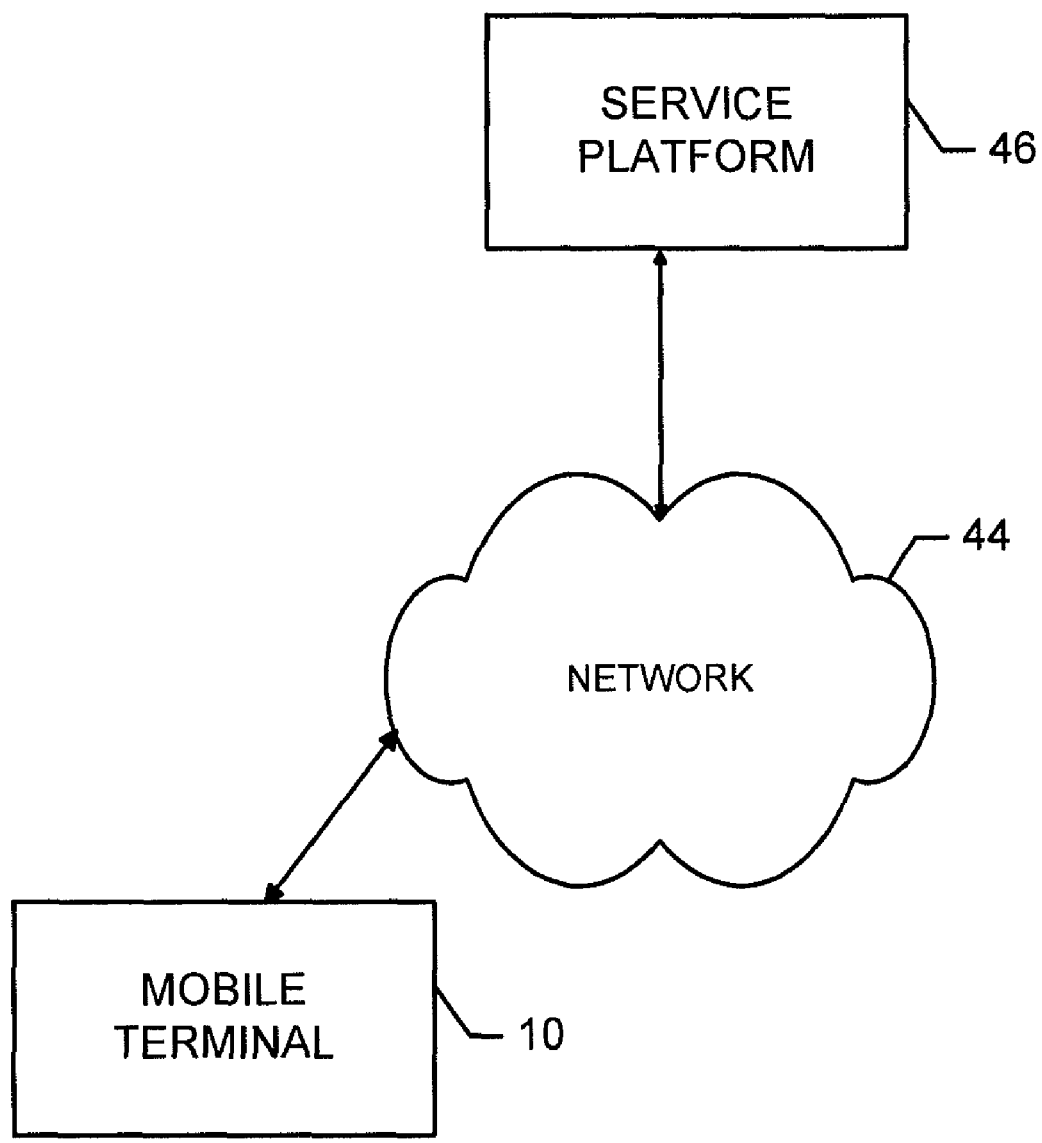
FIG. 2 is a schematic block diagram of a system showing an example of a communication environment according to an exemplary embodiment of the present invention.

FIG. 2 illustrates a generic system diagram in which a device such as a user terminal 10, which may benefit from embodiments of the present invention, is shown in an exemplary communication environment. As shown in FIG. 2, an embodiment of a system in accordance with an example embodiment of the present invention may include a communication device (e.g., user terminal 10) and a network entity (e.g., service platform 46) capable of communication with each other via a network 44 to provide, request and/or receive information. In some embodiments, either or both of the user terminal 10 and the service platform 46 may include an apparatus 50 (e.g., shown in FIG. 3) that may be configured to employ embodiments of the present invention. In this regard, it should be noted that the apparatus 50, which will be described in greater detail below, may be separately embodied at either one of the user terminal 10 or service platform 46 or at both of the user terminal 10 and the service platform 46 entirely or in a distributed manner. In some situations, the service platform 46 may not comprise or execute a client application. In some cases, embodiments of the present invention may further include one or more additional communication devices. In some embodiments, not all systems that employ embodiments of the present invention may comprise all the devices illustrated and/or described herein.

The network 44 may include a collection of various different nodes, devices or functions that may be in communication with each other via corresponding wired and/or wireless interfaces. As such, the illustration of FIG. 2 should be understood to be an example of a broad view of certain elements of the system and not an all inclusive or detailed view of the system or the network 44. Although not necessary, in some embodiments, the network 44 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. In some embodiments, the network 44 may be a P2P network (e.g., including WLAN and/or Bluetooth).

In an example embodiment, the service platform 46 may be a device or node such as a server or other processing element. The service platform 46 may have any number of functions or associations with various services. As such, for example, the service platform 46 may be a platform such as a dedicated server (or server bank) associated with a particular information source or service (e.g., a search service and/or a mapping service), or the service platform 46 may be a backend server associated with one or more other functions or services. As such, the service platform 46 may represent a plurality of different services or information sources. The functionality of the service platform 46 may be provided by hardware and/or software components configured to operate in accordance with known techniques for the provision of information to users of communication devices. However, some of the functionality provided by the service platform 46 may be information provided in accordance with embodiments of the present invention.

In an exemplary embodiment, the service platform 46 may represent a source for accessing content that may be provided to the user terminal 10 in accordance with embodiments of the present invention. As such, for example, the user terminal 10 may run a client application configured to communicate with a corresponding server function at the service platform 46. The client application may be configured to request content (e.g., from a web page) that may not be accessible to the user terminal 10, while the server function may access the requested content (e.g., at the web page) and capture the content (e.g., via image(s)). The captured content may then be provided to the user terminal 10 for display via the client application.

Figure 3:
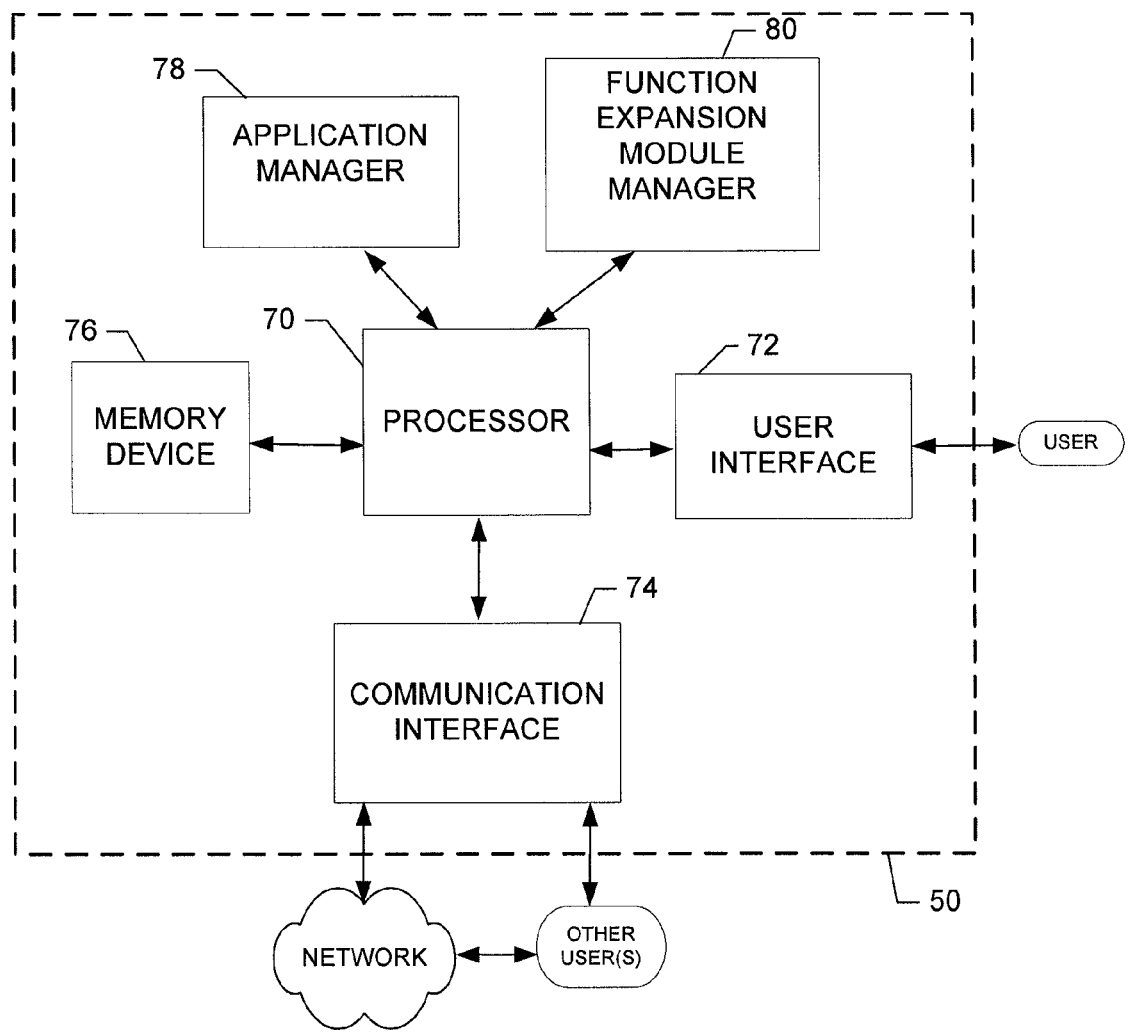
FIG. 3 illustrates a schematic block diagram of an apparatus for providing unrestricted content on a user terminal according to an exemplary embodiment of the present invention.

FIG. 3 illustrates a schematic block diagram of an apparatus for enabling the provision of unrestricted content according to an exemplary embodiment of the present invention. An exemplary embodiment of the invention will now be described with reference to FIG. 3, in which certain elements of an apparatus 50 for providing unrestricted content are displayed. The apparatus 50 of FIG. 3 may be employed, for example, on the mobile terminal 10 (and/or one or more other communication device). Alternatively, the apparatus 50 may be embodied on a network device of the network 44. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 3, an apparatus 50 for providing unrestricted content is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 44). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse or other scrolling device, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control an application manager 78 and a function expansion module manager 80. The application manager 78 and the function expansion module manager 80 may each be any means such as a device or circuitry embodied in hardware, software or a combination of hardware and software (e.g., processor 70 operating under software control, the processor 70 embodied as an ASIC or FPGA specifically configured to perform the operations described herein, or a combination thereof) that is configured to perform the corresponding functions of the application manager 78 and the function expansion module manager 80, respectively, as described below.

In an exemplary embodiment, any or all of the application manager 78 and the function expansion module manager 80 may include instructions, code, modules, applications and/or circuitry for providing unrestricted content on a user terminal. However, it should be noted that code, circuitry and/or instructions associated with the application manager 78 and the function expansion module manager 80 need not necessarily be modular. In some embodiments, communication between the application manager 78 and the function expansion module manager 80 is conducted via the processor 70. However, the application manager 78 and the function expansion module manager 80 are alternatively in direct communication with each other or may have no communication with each other in other embodiments.

The application manager 78 may be configured to execute a browser or web browser application. In some examples, the application manager 78 may be a browser or web application. The application manager 78 may be configured to access or otherwise fetch a page (e.g., a web page) associated with a Uniform Resource Identifier (URI) (e.g., a Uniform Resource Locator (URL)), and detect or identify at least one object associated with the page or otherwise located within a defined area or portion of the page. The application manager 78 may also be configured to recognize the need to use a plug-in when the information of the page (e.g., the HTML of the page) includes an object element. The detailed parameters of the object element specify the type of data that may be displayed for that object, a type of plug-in that may be used to fetch, decode, and/or display the data, and where the plug-in may be available. The application manager 78 may further be configured to determine that the object requires an unknown plug-in that may not available to the application manager 78 either by not being pre-installed or by not being available to be downloaded from a source where the plug-in may be specified to be available. The application manager 78 may also be configured to determine that there is no version of the plug-in available that is compatible with the application manager 78. The application manager 78 may additionally be configured to automatically invoke a communal plug-in (e.g., via the function expansion module manager) instead of the unknown plug-in. For example, upon rendering hypertext associated with the URL, the application manager 78 may invoke a plug-in associated with the object. In other words, the communal plug-in may be substituted for the unknown plug-in, and may be provided within the area defined for the object (or within a vicinity thereof). In some situations, the communal plug-in may be loaded by one or more application program interface(s) (e.g., Netscape plug-in APIs). In some examples, as mentioned above, the application manager 78 may also be configured to detect inefficient plug-ins and substitute the inefficient plug-ins with the communal plug-in. The application manager 78 may be configured to identify and communicate various information to the communal plug-in (e.g., via the function expansion module manager 80).

In some embodiments, the function expansion module manager 80 may be embodied as a function expansion module such as a communal plug-in, or other similar function expansion applications (which may be modular). The function expansion module manager may be configured to receive information from the application manager 78 and communicate the received information to a network entity. The function expansion module manager 80 may be configured to receive from the application manager 78 the value of the URL (e.g., URL address), information associated with the object (e.g., identification, properties, parameters, position, size and/or scale within the page, other information for the source document of the page such as, for example, HTLM, and/or the like), the page (e.g., cookie information, login information such as user name and/or password, for example, to enable authentication and other security protocols, and/or the like), other information, such as information associated with the browser and/or user terminal (e.g., the size of the display of the user terminal, the portion of the page visible within a viewable area of the display, screen resolution, other configurations, properties, and/or parameters of the browser and/or user terminal, and/or the like), and/or the like. The function expansion module manager 80 may also be configured to receive any user interactions with the web page via input events received from a user interface, such as, for example, key press events (e.g., on a keypad), touch events (e.g., on a touch display), scrolling events (e.g., on a scrolling device), other events associated with the page (e.g., via JavaScript, Document Object Model (DOM), other scripting language, computer or web programming language, and/or the like).

The function expansion module manager 80 may be configured to communicate with a network entity (which may be located remotely from the user terminal or locally) such as the service platform 46, for example, by establishing a session (e.g., a communication session) with the network entity. In some examples, the function expansion module manager 80 may be associated with the network entity, or in other words, the function expansion module manager 80 may be dedicated to the network entity. The function expansion module manager 80 may maintain a communication with the network entity for a period time (e.g., determined by the user, predetermined based on various criteria) or indefinitely, during which the function expansion module manager 80 and the network entity may exchange (e.g., send, receive) information so as to maintain the context of the page (e.g., the content of the page for example within a viewable portion of the user terminal) in sync between the browser of the user terminal and the browser of the network entity. In this regard, the function expansion module manager 80 may be configured to communicate the information received from the application manager 78 to the network entity.

The network entity may execute a browser (e.g., a full web browser) which may comprise the unknown plug-in needed to access or otherwise fetch the page and content associated with the received value of the URL (e.g., the same page displayed by the mobile device). The network entity may be configured to identify the position of the object within the page, and capture the content associated with the portion of the page corresponding to the object (e.g., capture of image(s), audio, other media, multimedia, and/or other types of content associated with the content associated with the object) as provided (e.g., displayed, played, and/or the like) within the browser of the network entity. The network entity may be configured to use encoding (e.g., media or multimedia encoding) and/or compression (e.g., media or multimedia compression) technology, scale, resize, or otherwise modify the captured provided content based at least in part on the information received from the function expansion module manager 80 (e.g., information associated with the object, the page, the browser, and/or user terminal), such as to fit the area defined for the object. In this regard, the network entity may be configured to use video codecs to compress the images instead of run-length bitmap compression codecs, although, in some embodiments, a run-length bitmap compression codecs may additionally be used. The network entity may be configured to communicate the modified captured content to the function expansion module manager 80 through a network, for example, in a continuous stream at the fastest frame rate possible (e.g., in light of the data transmission capabilities of the network). The network entity may communicate the captured portion of the page to the communal plug-in in various different manners (e.g., image stream(s), video stream(s), audio stream(s), stream(s) of other types of media, multimedia, and/or other types of content). In other words, the function expansion module manager 80 may be configured to cause the network entity to the fetch the page associated with the URL, including the content associated with the object, and communicate the content associated with the object to the function expansion module manager 80.

The function expansion module manager 80 may be configured to receive the stream of data, decode and/or decompress the data, and/or cause the stream of data to be automatically and seamlessly provided (e.g., displayed within the area defined for the object and/or played) in the browser of the user terminal (or within a vicinity thereof). The function expansion module manager 80 may also be configured to produce audio, sound, touch, smell, motion, heat, vibration, or any other perceivable content, or data that can interact, control, or otherwise affect any other system or application or device (e.g., user terminal), for example in response to the data received from the network entity. The data may be displayed and/or played using application program interface(s) such as, for example, Netscape plug-in APIs. In some examples, the network entity may be configured to capture and communicate the content of the entire page displayed by its browser in a similar manner as described above. The function expansion module manager 80 may thus cause the data received from the network entity to be seamlessly and automatically displayed and/or played within the browser of the user terminal in a similar manner as described above. In some situations, the object may be an interactive application and the data associated therewith may be in an interactive format (e.g., interactive content such as interactive media, multimedia, and/or the like). As such, the function expansion module manager 80 may function as a player. For example, the data associated with the object may be in a Flash format, and accordingly, the unknown plug-in may be a Flash plug-in. In this regard, in accordance with an exemplary embodiment of the present application, the communal plug-in may function as a Flash player.

The function expansion module manager 80 and the network entity may continuously exchange information so as to maintain the context of the page (e.g., the content of the page for example within a viewable portion of the user terminal) in sync between the browser of the user terminal and the browser of the network entity. As such, the network entity may continuously communicate data indicative of any and all the changes to the content associated with the object as displayed on the server browser, and the function expansion module manager 80 may continuously cause the content of the object displayed on the user terminal browser to be update based at least in part on the data received from the network entity. In this regard, local interaction between the user of the mobile device and the browser of the network entity may be simulated. As such, the network entity may be configured to capture any changes to the object (and/or the page) displayed within its browser to the function expansion module manager 80. In some examples, the network entity may capture the entire content associated with the object and any associated media or multimedia, and communicate the captured data to the function expansion module manager 80. The function expansion module manager 80 may be configured to cause the content associated with object (and/or the page) displayed on the browser of the user terminal 10 to be modified based at least in part on the data received from the network entity. In other examples, the network entity may be configured to capture a subset of the content displayed which may correspond to the changed portion of the content on the display (e.g., one or more pixels) instead of capturing the entire display of the content. In this regard, the function expansion module manager 80 may be configured to receive a stream of incremental and/or differential changes to a previous state of the content displayed. For example, the network entity may send MPEG streams comprising i-frames, and then send difference frames which may comprise only the changed pixels or areas of the image.

The function expansion module manager 80 may be configured to communicate user interactions and other events associated with the page at the browser of the user terminal, and the network entity may be configured to execute the exact same or interactions similar to the events and/or user interactions received from the function expansion module manager 80 in response to their receipt. These interactions and events may cause a modification of the content on the page displayed by the browser of the network entity, including the content associated with the object. As such, the network entity may communicate the changes to the object and/or the page to the function expansion module manager 80, and the function expansion module manager 80 may be configured to cause the page displayed on the browser of the user terminal 10 to execute the exact same or similar changes with respect to the object and/or the entire page. Similarly, the network entity may be configured to capture all the events and interactions received from the page displayed by the browser of the network entity, and communicate those events and interactions to the function expansion module manager 80. The function expansion module manager 80 may be configured to cause the page displayed on the browser of the user terminal 10 to execute the exact same or similar events and/or user interactions received from the network entity.

As such, the function expansion module manager 80 may be configured to enable the provision of content associated with object(s) with unknown plug-ins, the content of which may not otherwise be accessed and/or provided without the unknown plug-in, and maintain the context of the page (e.g., the content of the page for example within a viewable portion of the user terminal) in sync between the browser of the user terminal and the browser of the network entity. As such, a full browser experience may be provided to the user of a user terminal.

Figure 4:
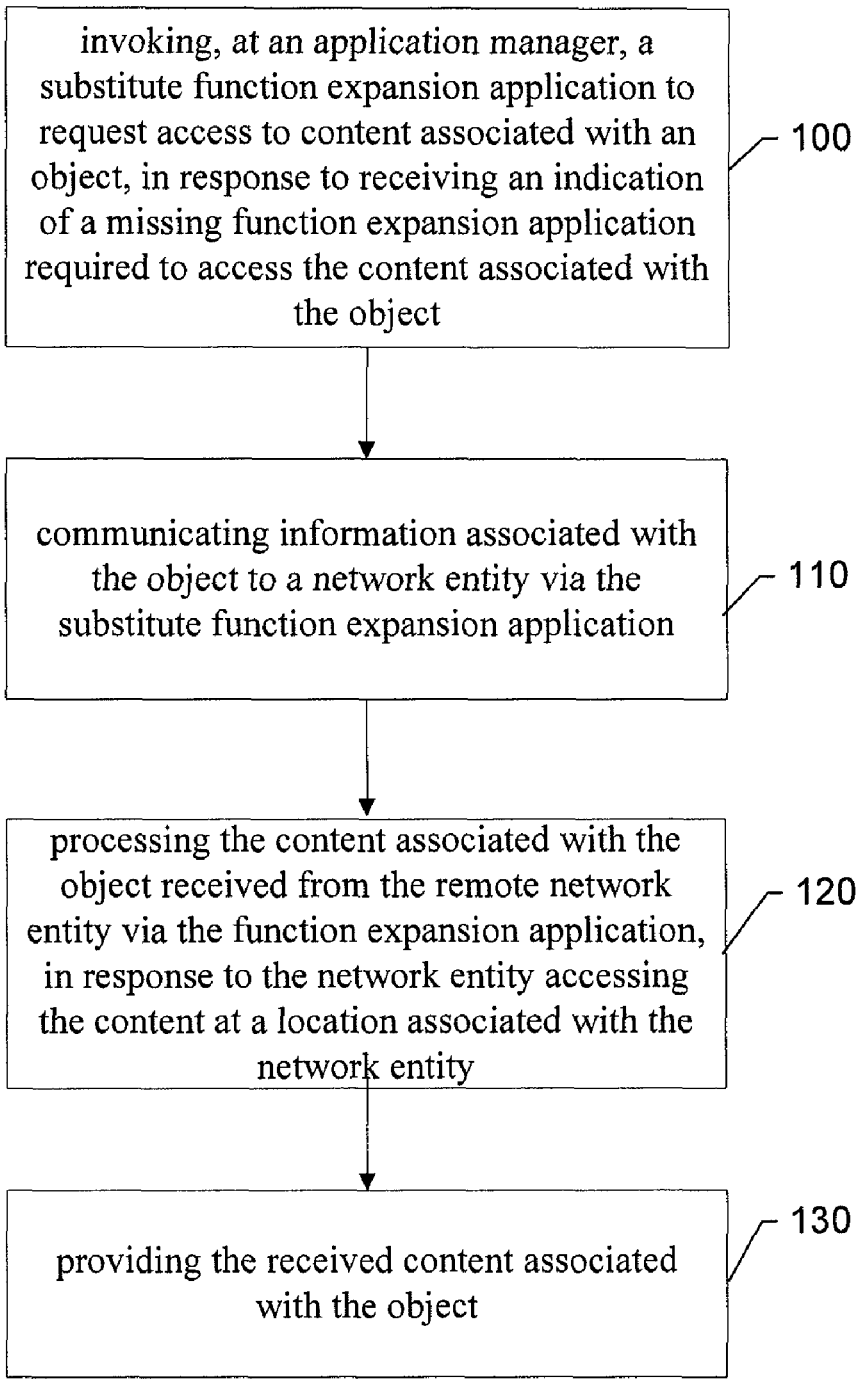
FIG. 4 is a block diagram according to an exemplary method for providing unrestricted content on a user terminal according to an exemplary embodiment of the present invention.

FIG. 4 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the user terminal or network device and executed by a built-in processor in the user terminal or network device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing unrestricted content on a user terminal as illustrated, for example, in FIG. 4 may include invoking, at an application manager, a substitute function expansion application to request access to content associated with an object, in response to receiving an indication of an unknown function expansion application required to access the content associated with the object at operation 100. The method may also include communicating information associated with the object to a network entity via the substitute function expansion application at operation 110. The method may further include processing the content associated with the object received from the remote network entity via the function expansion application, in response to the network entity accessing the content at a location associated with the network entity at operation 120. The method may additionally include providing the received content associated with the object at operation 130.

In some embodiments, certain ones of the operations above may be modified or further amplified as described below. It should be appreciated that each of the modifications or amplifications below may be included with the operations above either alone or in combination with any others among the features described herein. In this regard, for example, invoking, at an application manager, a substitute function expansion application to request access to content associated with an object at operation 100 may include invoking the substitute function expansion application to request access to content associated with an object provided within a defined area of a page retrieved by a browser application. In some cases, invoking, at an application manager, a function expansion application to request access to content associated with an object may include replacing the unknown function expansion application with the substitute function expansion application. Alternatively or additionally, replacing the unknown function expansion application with the invoked function expansion application may include providing the invoked function expansion application within the defined area of the page. In exemplary embodiments, processing the content associated with the object received from the remote network entity via the function expansion application at operation 120 may include receiving at least one captured image of the content associated with the object, in response to the network entity capturing an image of the content at the location associated with the network entity. In some situations, receiving at least one captured image of the content associated with the object may include receiving a stream of captured images of the content from the network entity.

In an exemplary embodiment, an apparatus for performing the method of FIG. 4 above may comprise a processor (e.g., the processor 70) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, the processor 70, the application manager 78, the function expansion module manager 80, and/or an algorithm executed by the processor 70 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   invoking, via at least one processor, at an application manager, a substitute function expansion application to request access to content associated, at least in part, with an object, in response to receiving an indication of an unknown function expansion application required to access the content associated, at least in part, with the object;
   determining to communicate information associated, at least in part, with the object to a remote network entity via the substitute function expansion application;
   processing the content associated with the object received from the remote network entity via the function expansion application, in response to the network entity accessing the content at a location associated, at least in part, with the network entity; and
   determining to provide the received content associated, at least in part, with the object.

2. The method of claim 1, wherein invoking a substitute function expansion application to request access to content associated, at least in part, with an object comprises invoking the substitute function expansion application to request access to content associated, at least in part, with an object provided within a defined area of a page retrieved by a browser application.

3. The method of claim 2, wherein invoking a function expansion application to request access to content associated, at least in part, with an object comprises replacing the unknown function expansion application with the substitute function expansion application.

4. The method of claim 3, wherein replacing the unknown function expansion application with the invoked function expansion application comprises providing the invoked function expansion application within the defined area of the page.

5. The method of claim 1, wherein processing the content associated, at least in part, with the object received from the remote network entity via the function expansion application comprises determining to receive at least one captured image of the content associated, at least in part, with the object, in response to the network entity capturing an image of the content at the location associated, at least in part, with the network entity.

6. The method of claim 5, wherein determining to receive at least one captured image of the content associated with the object comprises determining to receive a stream of captured images of the content from the network entity.

7. A computer program product comprising at least one non-transitory computer-readable storage medium having computer-executable program code instructions stored therein, the computer-executable program code instructions comprising:
   program code instructions for determining to invoke a substitute function expansion application to request access to content associated, at least in part, with an object, in response to receiving an indication of an unknown function expansion application required to access the content associated, at least in part, with the object;
   program code instructions for determining to communicate information associated, at least in part, with the object to a remote network entity via the substitute function expansion application;
   program code instructions for processing the content associated with the object received from the remote network entity via the function expansion application, in response to the network entity accessing the content at a location associated, at least in part, with the network entity; and
   program code instructions for determining to provide the received content associated, at least in part, with the object.

8. A computer program product according to claim 7, wherein program code instructions for determining to invoke a substitute function expansion application to request access to content associated, at least in part, with an object comprises instructions for determining to invoke the substitute function expansion application to request access to content associated, at least in part, with an object provided within a defined area of a page retrieved by a browser application.

9. A computer program product according to claim 8, wherein program code instructions for determining to invoke a function expansion application to request access to content associated, at least in part, with an object comprises instructions for determining to replace the unknown function expansion application with the substitute function expansion application.

10. A computer program product according to claim 9, wherein program code instructions for determining to replace the unknown function expansion application with the invoked function expansion application comprises instructions for determining to provide the invoked function expansion application within the defined area of the page.

11. A computer program product according to claim 7, wherein program code instructions for processing the content associated, at least in part, with the object received from the remote network entity via the function expansion application comprises instructions for determining to receive at least one captured image of the content associated, at least in part, with the object, in response to the network entity capturing an image of the content at the location associated, at least in part, with the network entity.

12. A computer program product according to claim 11, wherein program code instructions for determining to receive at least one captured image of the content associated, at least in part, with the object comprises instructions for receiving a stream of captured images of the content from the network entity.

13. An apparatus comprising:
   at least one processor; and
   at least one memory including computer program code for one or more programs, the at least one memory and the computer program code configured to, with the at least one processor, cause the apparatus to perform at least the following:
   determine to invoke a substitute function expansion application to request access to content associated, at least in part, with an object, in response to receiving an indication of an unknown function expansion application required to access the content associated, at least in part, with the object;

determine to communicate information associated with the object to a remote network entity via the substitute function expansion application;

process the content associated, at least in part, with the object received from the remote network entity via the function expansion application, in response to the remote network entity accessing the content at a location associated, at least in part, with the remote network entity; and determine to provide the received content associated, at least in part, with the object.

14. An apparatus according to claim 13, wherein the apparatus is further caused to determine to invoke a substitute function expansion application to request access to content associated, at least in part, with an object by determining to invoke the substitute function expansion application to request access to content associated, at least in part, with an object provided within a defined area of a page retrieved by a browser application.

15. An apparatus according to claim 14, wherein the apparatus is further caused to determine to invoke a function expansion application to request access to content associated, at least in part, with an object by determining to replace replacing the unknown function expansion application with the substitute function expansion application.

16. An apparatus according to claim 15, wherein the apparatus is further caused determine to replace the unknown function expansion application with the invoked function expansion application by providing the invoked function expansion application within the defined area of the page.

17. An apparatus according to claim 13, wherein the apparatus is further caused to process the content associated, at least in part, with the object received from the remote network entity via the function expansion application by determining to receive at least one captured image of the content associated, at least in part, with the object, in response to the network entity capturing an image of the content at the location associated, at least in part, with the network entity.

18. An apparatus according to claim 17, wherein the apparatus is further caused to determine to receive at least one captured image of the content associated, at least in part, with the object by determining to receive a stream of captured images of the content from the network entity.

* * * * *